United States Patent [19]
Schmoyer et al.

[11] Patent Number: 5,876,211
[45] Date of Patent: Mar. 2, 1999

[54] EDUCATIONAL BOARD GAME AND METHOD OF PLAY

[76] Inventors: Linda Rodebaugh Schmoyer, 2805 W. Crossing Cir., Norristown, Pa. 19403; Janet V. Balukas, 5170 Westchester Pike, Newtown Square, Pa. 19073; Jacqueline Moss Fetzer, 714 Glen Echo, Houston, Tex. 77024

[21] Appl. No.: 865,611
[22] Filed: May 29, 1997
[51] Int. Cl.⁶ .................................................. G09B 19/22
[52] U.S. Cl. ........................ 434/128; 273/243; 273/249
[58] Field of Search ................................ 434/128, 433; 273/236, 242, 243, 249, 248

[56] References Cited

U.S. PATENT DOCUMENTS

| | | |
|---|---|---|
| 4,065,131 | 12/1977 | Martin, Jr. et al. . |
| 4,089,527 | 5/1978 | Roth . |
| 4,368,889 | 1/1983 | Reker, Jr. . |
| 4,907,808 | 3/1990 | Turner et al. . |
| 4,936,589 | 6/1990 | Sinclair . |
| 4,955,616 | 9/1990 | Ingalls . |
| 5,048,842 | 9/1991 | Proctor . |
| 5,139,268 | 8/1992 | Gernett . |
| 5,244,391 | 9/1993 | Bryant . |
| 5,332,227 | 7/1994 | Passero . |
| 5,360,216 | 11/1994 | Counterman . |
| 5,377,991 | 1/1995 | Olsen . |
| 5,405,150 | 4/1995 | Loder . |

FOREIGN PATENT DOCUMENTS

| | | | |
|---|---|---|---|
| 2231277 | 11/1990 | United Kingdom | ................... 273/243 |

*Primary Examiner*—Jeffrey A. Smith

[57] ABSTRACT

An Educational Board Game for simulating the school system and educating players on a variety of subjects through interactive play. The inventive device includes a game board including a perimetrical movement track and a diagonal movement track interconnecting a central starting and finishing area of the game board with the perimetrical movement track wherein the perimetrical movement track and the diagonal movement track are each divided into a plurality of individual spaces. A plurality of playing pieces are provided for movement among the plurality of individual spaces of the game board and a plurality of query cards each having printed thereon a plurality of questions and a plurality of answers for each of a number of subject matter categories are provided for determining acquisition of a quantity of game money. A plurality of opportunity cards and a plurality of risks cards each having printed thereon favorable announcements and mandates and unfavorable announcements and mandates, respectively, are provided for introducing instructions to be followed during the course of the game.

14 Claims, 4 Drawing Sheets

EDUCATIONAL BOARD GAME AND METHOD OF PLAY

BACKGROUND OF THE INVENTION

1. Field of the Invention

The present invention relates to board games and more particularly pertains to a new Educational Board Game for simulating the school system and educating players on a variety of subjects through interactive play.

2. Description of the Prior Art

The use of board games is known in the prior art. More specifically, board games heretofore devised and utilized are known to consist basically of familiar, expected and obvious structural configurations, notwithstanding the myriad of designs encompassed by the crowded prior art which have been developed for the fulfillment of countless objectives and requirements.

Known prior art board games include U.S. Pat. No. 5,244,391; U.S. Pat. No. 5,377,991; U.S. Pat. No. 5,405,150; U.S. Pat. No. 5,332,227; U.S. Pat. No. 5,048,842; and U.S. Pat. No. 4,907,808.

While these devices fulfill their respective, particular objectives and requirements, the aforementioned patents do not disclose a new Educational Board Game. The inventive device includes a game board including a perimetrical movement track and a diagonal movement track interconnecting a central starting and finishing area of the game board with the perimetrical movement track wherein the perimetrical movement track and the diagonal movement track are each divided into a plurality of individual spaces. A plurality of playing pieces are provided for movement among the plurality of individual spaces of the game board and a plurality of query cards each having printed thereon a plurality of questions and a plurality of answers for each of a number of subject matter categories are provided for determining acquisition of a quantity of game money. A plurality of opportunity cards and a plurality of risks cards each having printed thereon favorable announcements and mandates and unfavorable announcements and mandates, respectively, are provided for introducing instructions to be followed during the course of the game.

In these respects, the Educational Board Game according to the present invention substantially departs from the conventional concepts and designs of the prior art, and in so doing provides an apparatus primarily developed for the purpose of simulating the school system and educating players on a variety of subjects through interactive play.

SUMMARY OF THE INVENTION

In view of the foregoing disadvantages inherent in the known types of board games now present in the prior art, the present invention provides a new Educational Board Game construction wherein the same can be utilized for simulating the school system and educating players on a variety of subjects through interactive play.

The general purpose of the present invention, which will be described subsequently in greater detail, is to provide a new Educational Board Game apparatus and method which has many of the advantages of the board games mentioned heretofore and many novel features that result in a new Educational Board Game which is not anticipated, rendered obvious, suggested, or even implied by any of the prior art board games, either alone or in any combination thereof.

To attain this, the present invention generally comprises a game board including a perimetrical movement track and a diagonal movement track interconnecting a central starting and finishing area of the game board with the perimetrical movement track wherein the perimetrical movement track and the diagonal movement track are each divided into a plurality of individual spaces. A plurality of playing pieces are provided for movement among the plurality of individual spaces of the game board and a plurality of query cards each having printed thereon a plurality of questions and a plurality of answers for each of a number of subject matter categories are provided for determining acquisition of a quantity of game money. A plurality of opportunity cards and a plurality of risks cards each having printed thereon favorable announcements and mandates and unfavorable announcements and mandates, respectively, are provided for introducing instructions to be followed during the course of the game.

There have thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Educational Board Game apparatus and method which has many of the advantages of the board games mentioned heretofore and many novel features that result in a new Educational Board Game which is not anticipated, rendered obvious, suggested, or even implied by any of the prior art board games, either alone or in any combination thereof.

It is another object of the present invention to provide a new Educational Board Game which may be easily and efficiently manufactured and marketed.

It is a further object of the present invention to provide a new Educational Board Game which is of a durable and reliable construction.

An even further object of the present invention is to provide a new Educational Board Game which is susceptible of a low cost of manufacture with regard to both materials and labor, and which accordingly is then susceptible of low prices of sale to the consuming public, thereby making such Educational Board Game economically available to the buying public.

Still yet another object of the present invention is to provide a new Educational Board Game which provides in the apparatuses and methods of the prior art some of the advantages thereof, while simultaneously overcoming some of the disadvantages normally associated therewith.

Still another object of the present invention is to provide a new Educational Board Game for simulating the school system and educating players on a variety of subjects through interactive play.

Yet another object of the present invention is to provide a new Educational Board Game which includes a game boar d including a perimetrical movement track and a diagonal movement track interconnecting a central starting and finishing area of the game board with the perimetrical movement track wherein the perimetrical movement track and the diagonal movement track are each divided into a plurality of individual spaces. A plurality of playing pieces are provided for movement among the plurality of individual spaces of the game board and a plurality of query cards each having printed thereon a plurality of questions and a plurality of answers for each of a number of subject matter categories are provided for determining acquisition of a quantity of game money. A plurality of opportunity cards and a plurality of risks cards each having printed thereon favorable announcements and mandates and unfavorable announcements and mandates, respectively, are provided for introducing instructions to be followed during the course of the game.

Still yet another object of the present invention is to provide a new Educational Board Game that offers an entertaining and challenging board game with an educational theme.

Even still another object of the present invention is to provide a new Educational Board Game that could be played in the classroom as well as at home.

Even still another object of the present invention is to provide a new Educational Board Game that provides an enjoyable game that could be participated in for friendly competition and entertainment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
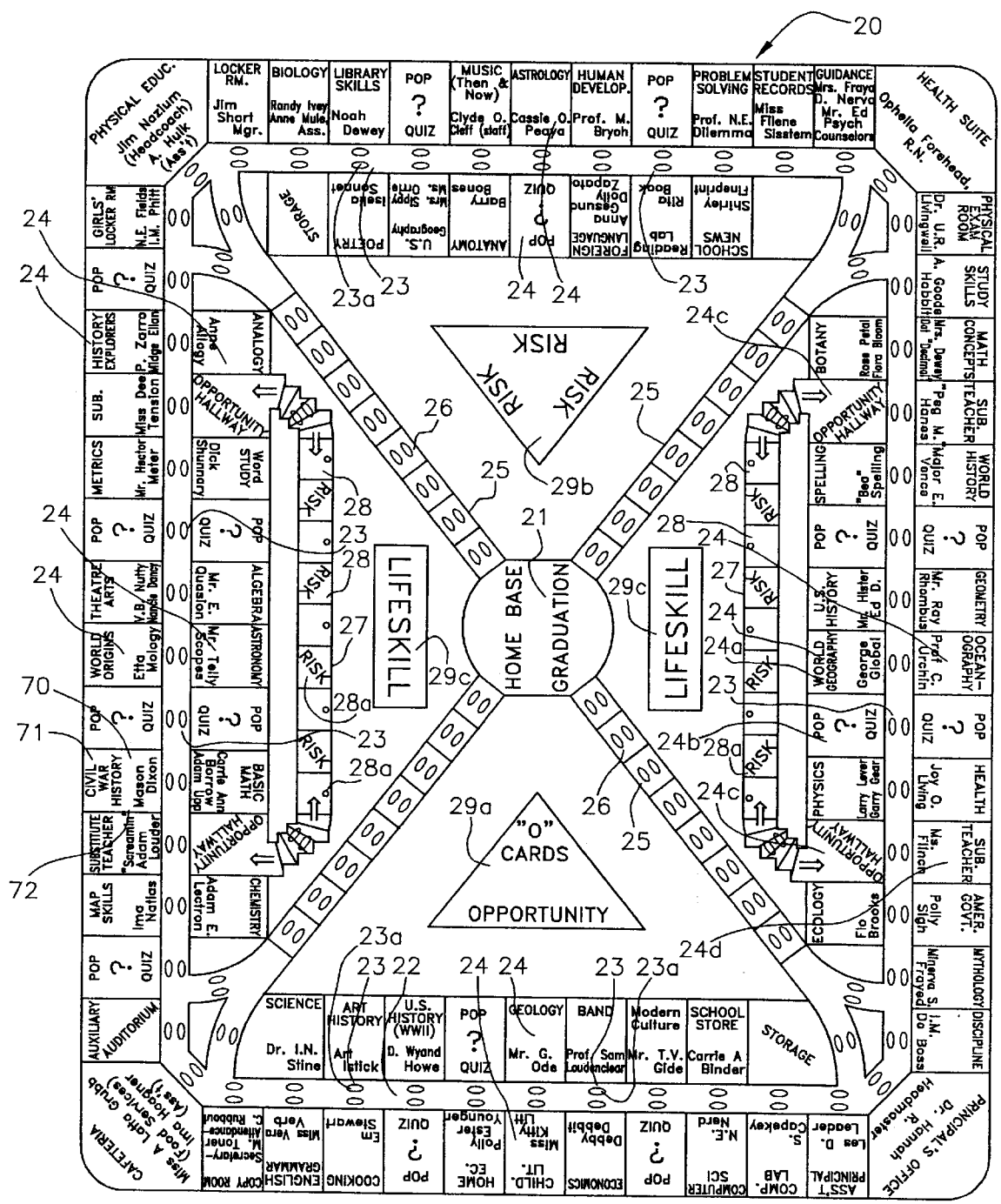
FIG. 1 is an illustration of the game board of a new Educational Board Game according to the present invention.

With reference now to the drawings, and in particular to FIGS. 1 through 9 thereof, a new Educational Board Game embodying the principles and concepts of the present invention will be described.

More specifically, it will be noted that the Educational Board Game comprises a game board 20 including a perimetrical movement track 22 and a diagonal movement track 25 interconnecting a central starting and finishing area 21 of the game board 20 with the perimetrical movement track 22 wherein the perimetrical movement track 22 and the diagonal movement track 25 are each divided into a plurality of individual spaces 23 and 26, respectively. A plurality of playing pieces 30 are provided for movement among the plurality of individual spaces 23 and 26 of the game board 20 and a plurality of query cards 40 each having printed thereon a plurality of questions and a plurality of answers for each of a number of subject matter categories are provided for determining acquisition of a quantity of game money 65. A plurality of opportunity cards 50 and a plurality of risks cards 55 each having printed thereon favorable announcements and mandates and unfavorable announcements and mandates, respectively, are provided for introducing instructions to be followed during the course of the game. The Educational Board Game is marketed under the name "Honor Roll" and is intended for educating players on a variety of subjects through interactive play.

As best illustrated in FIG. 1, it can be shown that the game board 20 includes a central starting and finishing area 21. In an illustrative embodiment, the central starting and finishing area 21 is designated as "Home Base and Graduation". An opportunity card position 29a, a risk card position 29b, and a lifeskill card position 29c are provided on the game board 20 for placement of the plurality of opportunity cards 50, the plurality of risk cards 55, and the plurality of lifeskill cards 45, respectively.

The perimetrical movement track 22 of the game board 20 is generally rectangular in shape and represents a school hallway wherein a number of the plurality of individual spaces 23 of the perimetrical movement track 22 have a pair of opposing classrooms 24 illustrated adjacent thereto. Each of the pair of opposing classrooms 24 comprises at least one of a subject matter classroom 24a, a pop quiz classroom 24b, an opportunity classroom 24c, and a substitute teacher classroom 24d. Each of the plurality of individual spaces 23 of the perimetrical movement track 22 are represented by indicia 23a simulating a pair of foot prints. In an illustrative embodiment, the perimetrical movement track 22 is designated as the "Hallowed Halls".

The subject matter classroom 24a of the pair of opposing classrooms 24 corresponds to one of the number of subject matter categories provided on the plurality of query cards 40. The subject matter classroom 24a has classroom indicia 70 therein identifying a classroom subject area 71 and a classroom teacher 72 wherein the classroom teacher 72 is a pun of the classroom subject area 71. Listed below are examples of the classroom subject area 71 and the classroom teacher 72 for a number of the subject matter classrooms 24a provided on the game board 20:

| | |
|---|---|
| COMPUTER SCIENCE | N. E. NERD |
| ECONOMICS | DEBBY DEBIT |
| GEOMETRY | RAY RHOMBUS |
| ENGLISH GRAMMAR | VERA VERB |
| WORLD HISTORY | MAJOR E. VENCE |
| AMERICAN GOVERNMENT | POLLY SIGH |
| PHYSICS | LARRY LEVER |
| CHEMISTRY | ADAM E. LECKTRON |

As best illustrated in FIG. 1, it can be shown that the diagonal movement track 25 is generally linear and interconnects the central starting and finishing area 21 of the game board 20 with the perimetrical movement track 22. In an illustrative embodiment, the diagonal movement track 25 is designated as the "Lifeskills Path".

As best illustrated in FIG. 1, it can be shown that a bypass movement track 27 is provided on the game board 20 parallel to a portion of the perimetrical movement track 22. The bypass movement track 27 is divided into a plurality of individual spaces 28 wherein a number of the plurality of individual spaces 28 of the bypass movement track 27 have illustrated thereon a draw card instruction 28a. The draw card instruction 28a comprises at least one of an instruction for drawing one of the plurality of opportunity cards 50 and an instruction for drawing one of the plurality of risk cards 55. In an illustrative embodiment, the instruction for drawing one of the plurality of opportunity cards 50 is represented by the letter "O" and the instruction for drawing one of the plurality of risk cards 55 is represented by the word "Risk". The bypass movement track 27 is accessible only through the opportunity classroom 24c of the pair of opposing classrooms 24 illustrated adjacent to a number of the plurality of individual spaces 23 of the perimetrical movement track 22 wherein the opportunity classroom 24c interconnects the bypass movement track 27 and the perimetrical movement track 22. In an illustrative embodiment, the bypass movement track 27 is designated as the "Opportunity Hallway".

Figure 2:
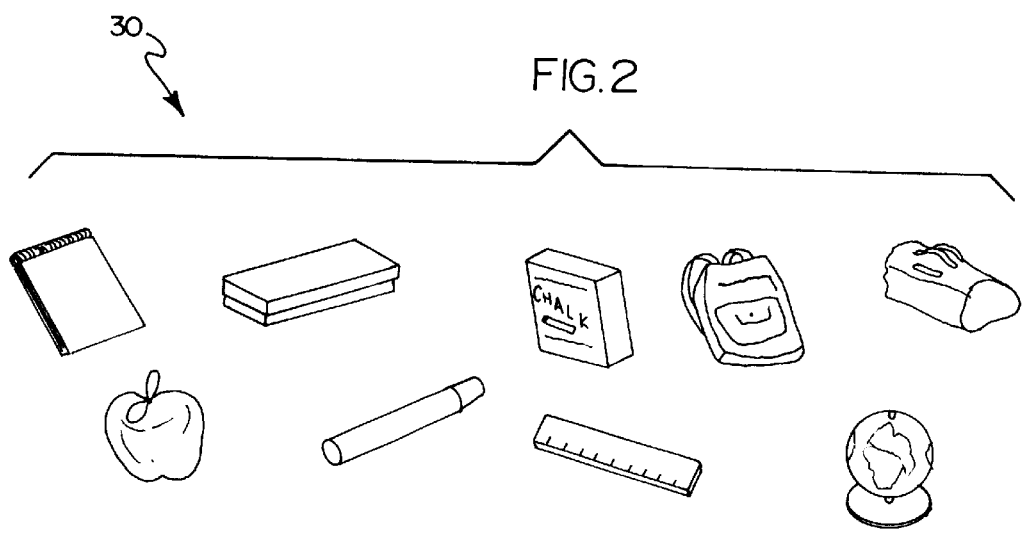
FIG. 2 is an illustration of the playing pieces of the present invention.

As best illustrated in FIG. 2, it can be shown that each of the plurality of playing pieces 30 are in the shape of a classroom object such as an assignment book, an apple, a chalkboard eraser, a marker, a ruler, a box of chalk, a book bag, a globe, a gym bag, and a stack of books.

Figure 3:
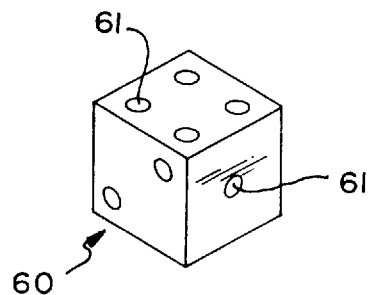
FIG. 3 is an illustration of the die for use with the present invention.

As best illustrated in FIG. 3, it can be shown that a die 60 is provided for determining advancement of the plurality of playing pieces 30 among the plurality of individual spaces 23, 26 and 28 of the game board 20. In an illustrative embodiment, the die 60 is six-sided and has indicia 61 thereon representing the numbers one (1) through six (6).

Figure 4:
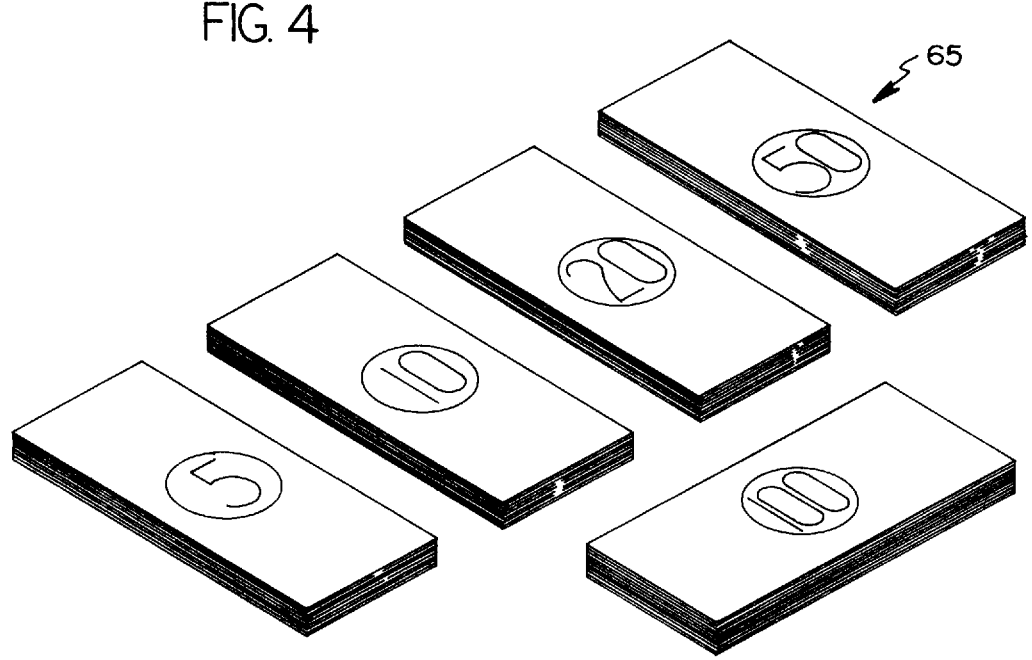
FIG. 4 is an illustration of the game money of the present invention.

As best illustrated in FIG. 4, it can be shown that game money 65 is provided in denominations of $5, $10, $20, $50, and $100. The game money 65 is provided for making payments mandated by the plurality of risks cards 55, for distributing money mandated by the plurality of opportunity cards 50, and for distributing money to a player when the player correctly answers questions provided on the plurality of query cards 40.

Figure 5A:
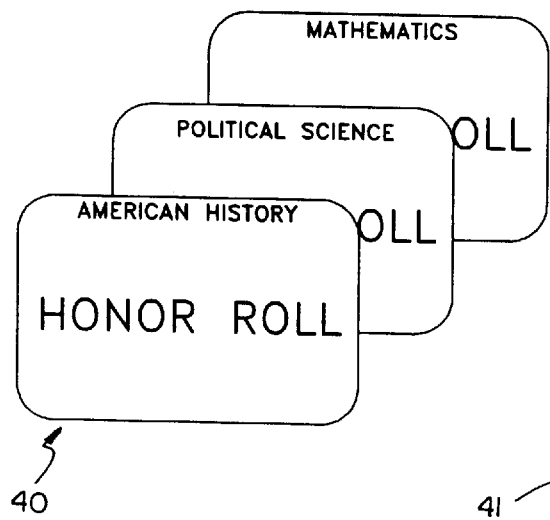
FIG. 5a is an illustration of a Query Card of the present invention.
Figure 5B:
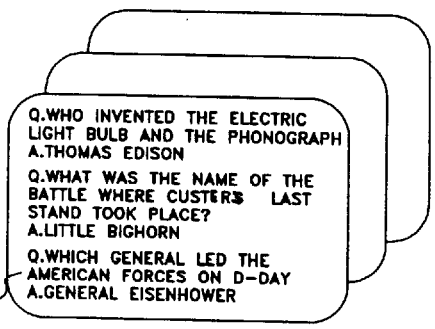
FIG. 5b is an exemplary illustration of the reverse side of a Query Card of the present invention.

As best illustrated in FIGS. 5a and 5b, it can be shown that each of the plurality of query cards 40 has provided thereon a plurality of questions and a plurality of answers for each of a number of subject matter categories. The plurality of questions and the plurality of answers are provided on a reverse side 41 of each of the plurality of query cards 40. The number of subject matter categories includes Mathematics, Literature/Language, Lifelong Learning, History, Science, and the Arts. Each of the number of subject matter categories are divided into a number of query card subject areas corresponding to the classroom subject area 71 of the subject matter classroom 24a provided on the game board 20. For example, the query card subject areas for the subject matter category of Science include biology, oceanography, ecology, physics, botany, anatomy, astronomy, chemistry, general science, and geology.

Figure 6A:
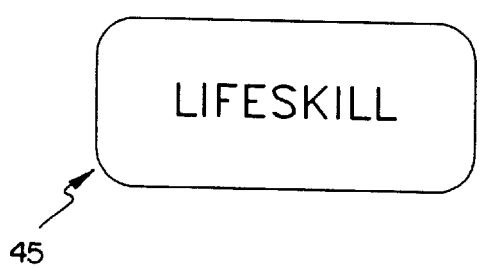
FIG. 6a is an illustration of a Lifeskill Card of the present invention.
Figure 6B:
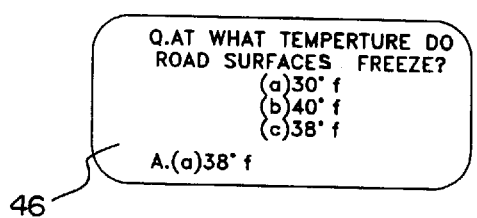
FIG. 6b is an exemplary illustration of the reverse side of a Lifeskill Card of the present invention.

As best illustrated in FIGS. 6a and 6b, it can be shown that a plurality of lifeskill cards 45 each having printed thereon a question and an answer are provided for determining advancement from the central starting and finishing area 21 to the diagonal movement track 25 and for determining advancement along the diagonal movement track 25 from the perimetrical movement track 22 to the central starting and finishing area 21. The question and the answer are provided on a reverse side 46 of each of the plurality of lifeskill cards 45. Listed below are examples of the questions and the answers provided on the plurality of lifeskill cards 45:

Q. AT WHAT TEMPERATURE DO ROAD SURFACES FREEZE?
  (a) 30° F.
  (b) 40° F.
  (c) 38° F.
A. (c) 38° F.
Q. IN THE PLEDGE OF ALLEGIANCE, WHAT IS THE LINE THAT FOLLOWS ". . . TO THE FLAG OF THE UNITED STATES OF AMERICA"?
A. "AND TO THE REPUBLIC FOR WHICH IT STANDS"
Q. IF YOU LIVE IN CALIFORNIA AND CALL YOUR FRIEND WHO LIVES IN PENNSYLVANIA AT 8:00 PM YOUR TIME, WHAT TIME IS IT AT YOUR FRIEND'S HOUSE?
A. 11:00 PM

Figure 7A:
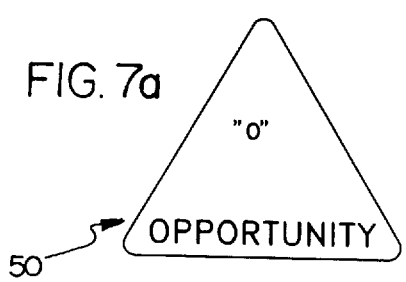
FIG. 7a is an illustration of an Opportunity Card of the present invention.
Figure 7B:
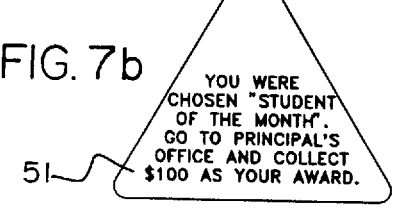
FIG. 7b is an exemplary instruction present on the reverse side of an Opportunity Card of the present invention.

As best illustrated in FIGS. 7a and 7b, it can be shown that each of the plurality of opportunity cards 50 has provided thereon favorable announcements and mandates wherein the plurality of opportunity cards 50 introduce instructions to be followed during the course of the game. The favorable announcements and mandates are provided on a reverse side 51 of each of the plurality of opportunity cards 50. Listed below are examples of the favorable announcements and mandates provided on the plurality of opportunity cards 50:
YOU WERE CHOSEN "STUDENT OF THE MONTH".
GO TO THE PRINCIPAL'S OFFICE AND COLLECT $100 AS YOUR AWARD.
GO TO THE GYM. YOU SERVED AS A LOCKER ROOM MONITOR
AND HELPED KEEP KIDS UNDER CONTROL. COLLECT $50.
YOU CAME TO THE RESCUE OF SOMEONE WHO GOT HURT ON THE PLAYGROUND.

GO TO THE NURSE'S OFFICE AND COLLECT $75.
YOU STUDIED HARD AND MADE HONOR ROLL ALL YEAR.
COLLECT $300.
YOUR MOTTO IS "IF AT FIRST YOU DON'T SUCCEED TRY, TRY AGAIN".
COLLECT $150.

Figure 8A:
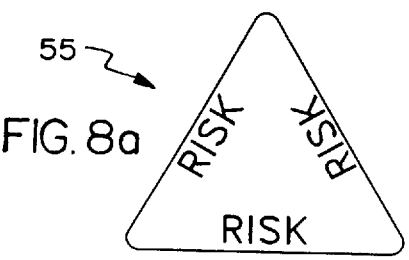
FIG. 8a is an illustration of a Risk Card of the present invention.
Figure 8B:
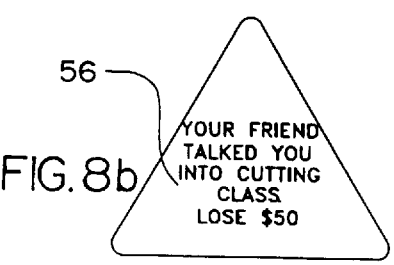
FIG. 8b is an exemplary instruction present on the reverse side of a Risk Card of the present invention.

As best illustrated in FIGS. 8a and 8b, it can be shown that each of the plurality of risk cards 55 has provided thereon unfavorable announcements and mandates wherein the plurality of risk cards 55 introduce instructions to be followed during the course of the game. The unfavorable announcements and mandates are provided on a reverse side 56 of each of the plurality of risk cards 55. Listed below are examples of the unfavorable announcements and mandates provided on the plurality of risk cards 55:
GO TO THE PRINCIPAL'S OFFICE BECAUSE OF YOUR POOR BEHAVIOR.
LOSE TWO TURNS.
YOUR FRIEND TALKED YOU INTO CUTTING CLASS.
LOSE $50.
YOU CAUGHT THE FLU THAT'S GOING AROUND IN SCHOOL.
GO TO THE NURSE'S OFFICE, LOSE A TURN.
INSTEAD OF STUDYING FOR A TEST, YOU WATCHED TV.
GO TO THE GUIDANCE COUNSELOR'S OFFICE.
LOSE A TURN AND $100.
YOU SPENT YOUR LUNCH MONEY ON JUNKFOOD IN THE SNACK MACHINE.
GO TO THE CAFETERIA TO CHARGE YOUR LUNCH.
LOSE A TURN AND $20.

Figure 9:
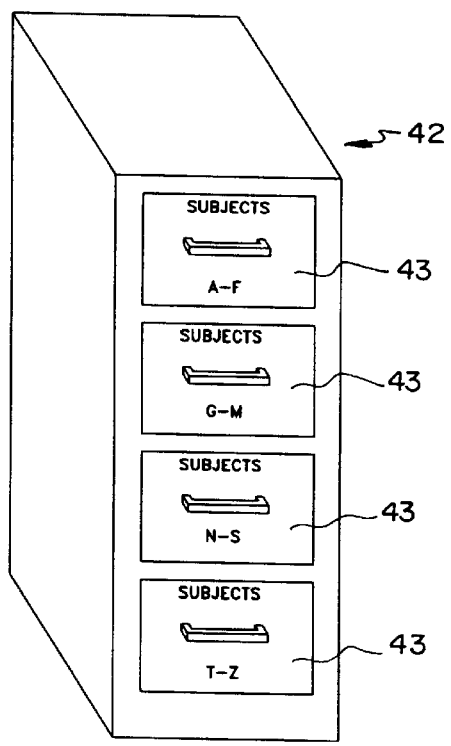
FIG. 9 is an illustration of a query card storage box of the present invention.

As best illustrated in FIG. 9, it can be shown that a query card storage box 42 is provided for storage of the plurality of query cards 40. The query card storage box 42 includes a plurality of drawers 43 for containing a specified grouping of the plurality of query cards 40 therein.

To play the Educational Board Game 10, a game board 20 including a central starting and finishing area 21, a perimetrical movement track 22, a bypass movement track 27 parallel to a portion of the perimetrical movement track 22, and a diagonal movement track 25 interconnecting the central starting and finishing area 21 and the perimetrical movement track 22 is provided, wherein the perimetrical movement track 22, the bypass movement track 27, and the diagonal movement track 25 are each divided into a plurality of individual spaces 23, 26, and 28, and wherein a number of the plurality of individual spaces 23 of the perimetrical movement track 22 have a pair of opposing classrooms 24 illustrated adjacent thereto. Each of the pair of opposing classrooms 24 comprises at least one of a subject matter classroom 24a, a pop quiz classroom 24b, an opportunity classroom 24c, and a substitute teacher classroom 24d, wherein the opportunity classroom 24c interconnects the bypass movement track 27 and the perimetrical movement track 22.

In addition, a plurality of playing pieces 30 to be moved among the plurality of individual spaces 23, 26, and 28 of the game board 20, a plurality of query cards 40 each having provided thereon a plurality of questions and a plurality of answers for each of a number of subject matter categories, a plurality of opportunity cards 50 and a plurality of risks cards 55 each having printed thereon favorable announcements and mandates and unfavorable announcements and mandates, respectively, a die 60, and a quantity of game money 65 are provided. A plurality of lifeskill cards 45 each having provided thereon a question and an answer are also provided.

To begin play, an initial quantity of game money 65 is distributed to each player and each player positions one of the plurality of playing pieces 30 in the central starting and finishing area 21. In an illustrative embodiment, the initial quantity of game money 65 is a percentage of the predetermined sum of game money a player attempts to acquire during the game. Each player rolls the die 60, and the player receiving the highest roll begins play. As such, one of the plurality of lifeskill cards 45 is selected and a question is read therefrom. The player provides an answer to the question and if the provided answer is correct, the player can advance from the central starting and finishing area 21 to the diagonal movement track 25. However, if the provided answer is incorrect the player cannot advance from the central starting and finishing area 21 to the diagonal movement track 25.

The player rolls the die 60 to determine the number of spaces among which the player may move his or her playing piece 30 along the diagonal movement track 25. The player moves his or her playing piece 30 the number of spaces represented on the die 60. When the player reaches the perimetrical movement track 22 the player progresses around the perimetrical movement track 22 in a clockwise direction.

When a player's playing piece 30 is positioned adjacent a pair of opposing classrooms 24, the player can choose between the pair of opposing classrooms 24. For example, if the player is positioned between two subject matter classrooms 24a, the player can choose from which of the subject matter classrooms 24a a corresponding one of the plurality of query cards 40 will be selected. If the player is positioned adjacent a subject matter classroom 24a and a pop quiz classroom 24b, the player can choose to have a query card 40 selected corresponding to the subject matter classroom 24a or choose to have another player select a query card 40 corresponding to any of the number of subject matter categories. If the player is positioned adjacent a substitute teacher classroom 24d, the player can choose to have a query card 40 selected corresponding to any of the number of subject matter categories.

As such, one of the plurality of query cards 40 is selected. The player then chooses how many questions from the plurality of questions, he or she will attempt to answer. One of the plurality of questions is read from the selected query card 40 and the player provides an answer to the question. If the provided answer is incorrect, the player's turn is completed. However, if the provided answer is correct, another of the plurality of questions of the selected query card 40 is read. In an illustrative embodiment, a maximum of three (3) questions are asked of any one player during any one turn. If the player answers all three questions correctly, the player receives another turn.

A quantity of game money 65 corresponding to the number of correct answers the player provides in response to the read questions is distributed to the player. In an illustrative embodiment, the quantity of game money 65 is $10 for each correct answer. If the player correctly answers a question read in response to the pop quiz classroom 24b, the player receives $20. However, if the player incorrectly answers a question read in response to the pop quiz classroom 24b, the player must pay each opponent $10.

When a player's playing piece 30 is positioned adjacent an opportunity classroom 24c, the player may choose to move his or her playing piece 30 to the bypass movement track 27. As such, the player must select an opportunity card 50 or a risk card 55 when they land on a corresponding space having provided thereon a draw card instruction for drawing an opportunity card 50 or a risk card 55. In addition, the player must follow the instruction mandated by the selected opportunity card 50 or risk card 55.

After a player acquires a predetermined sum of game money 65, the player must return to the central starting and finishing area 21 of the game board 20 to finish play of the game. In an illustrative embodiment, the predetermined sum of game money 65 is $1000 (novice), $3000 (advanced), or $5000 (expert). As the player moves along the diagonal movement track 25 to return to the central starting and finishing area 21, the player must correctly answer one question from one of the plurality of lifeskill cards 45 per turn.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An Educational Board Game comprising:
    a game board including a central starting and finishing area, a perimetrical movement track, and a diagonal movement track, said diagonal movement track interconnecting said central starting and finishing area and said perimetrical movement track, each of said perimetrical movement track and said diagonal movement track divided into a plurality of individual spaces;
    a plurality of playing pieces to be moved among said plurality of individual spaces of said perimetrical movement track and said plurality of individual spaces of said diagonal movement track;
    a quantity of game money for use during play of said game;
    a plurality of query cards, each of said plurality of query cards having provided thereon a plurality of questions and a plurality of answers for each of a number of subject matter categories, said plurality of query cards determining acquisition of a sum of said quantity of game money; and
    a die for determining movement of said plurality of playing pieces among said plurality of individual spaces of said perimetrical movement track and said plurality of individual spaces of said diagonal movement track.

2. The Educational Board Game of claim 1, wherein a number of said plurality of individual spaces of said perimetrical movement track have a pair of opposing classrooms provided adjacent thereto, each of said pair of opposing classrooms comprising at least one of a subject matter classroom, a pop quiz classroom, an opportunity classroom, and a substitute teacher classroom, said subject matter classroom corresponding to an associated one of said number of subject matter categories provided on said plurality of query cards, said pop quiz classroom and said substitute teacher classroom corresponding to a selected one of said number of subject matter categories.

3. The Educational Board Game of claim 2, further comprising:
    a plurality of opportunity cards having provided thereon favorable announcements and mandates, said plurality of opportunity cards introducing instructions to be followed during play of said game, and
    a plurality of risks cards having provided thereon unfavorable announcements and mandates, said plurality of risks cards introducing instructions to be followed during play of said game, and wherein
    said game board includes a bypass movement track parallel to a portion of said perimetrical movement track, said bypass movement track divided into a plurality of individual spaces,
    said opportunity classroom of said pair of opposing classrooms provided adjacent to a number of said plurality of individual spaces of said perimetrical movement track interconnecting said bypass movement track and said perimetrical movement track,
    a number of said plurality of individual spaces of said bypass movement track having a draw card instruction provided thereon, said draw card instruction comprising at least one of an instruction for drawing one of said plurality of opportunity cards and an instruction for drawing one of said plurality of risk cards.

4. The Educational Board Game of claim 1, wherein each of said plurality of playing pieces are in the shape of a classroom object, said classroom object comprising one of an assignment book, an apple, a chalkboard eraser, a marker, a ruler, a box of chalk, a book bag, a globe, a gym bag, and a stack of books.

5. The Educational Board Game of claim 1, wherein said game money is provided in denominations of $5, $10, $20, $50, and $100.

6. The Educational Board Game of claim 1, wherein said number of subject matter categories comprises at least one of Mathematics, Literature/Language, Lifelong Learning, History, Science, and the Arts.

7. The Educational Board Game of claim 1, further comprising:
    a plurality of lifeskill cards each having provided thereon a question and an answer, said plurality of lifeskill cards determining advancement along said diagonal movement track.

8. The Educational Board Game of claim 1, further comprising:
    a query card storage box for storage of said plurality of query cards, said query card storage box including a plurality of drawers for containing a group of said plurality of query cards therein.

9. A method of playing an Educational Board Game, comprising the steps of:
    (a) providing a game board including a central starting and finishing area, a perimetrical movement track, and a diagonal movement track, wherein said diagonal movement track interconnects said central starting and finishing area and said perimetrical movement track, wherein each of said perimetrical movement track and said diagonal movement track are divided into a plurality of individual spaces, and wherein a number of said plurality of individual spaces of said perimetrical movement track have a pair of opposing classrooms provided adjacent thereto, each of said pair of opposing classrooms comprising at least one of a subject matter classroom, a pop quiz classroom, and a substitute teacher classroom;

(b) providing a plurality of query cards having provided thereon a plurality of questions and a plurality of answers for each of a number of subject matter categories, wherein said subject matter classroom of said game board corresponds to one of said number of subject matter categories;

(c) distributing an initial quantity of game money to each player;

(d) positioning a playing piece in said central starting and finishing area of said game board;

(e) rolling a die to determine movement of said playing piece among said plurality of individual spaces of said diagonal movement track and said plurality of individual spaces of said perimetrical movement track;

(f) moving said playing piece among said plurality of individual spaces of said diagonal movement track and said plurality of individual spaces of said perimetrical movement track corresponding to a result of said rolled die;

(g) selecting one of said plurality of query cards when said playing piece is positioned adjacent at least one of said subject matter classroom, said pop quiz classroom, and said substitute teacher classroom, wherein said selected query card corresponds to at least one of said subject matter classroom when said playing piece is positioned adjacent said subject matter classroom and any of said number of subject matter categories when said playing piece is positioned adjacent at least one of said pop quiz classroom and said substitute teacher classroom;

(h) reading one of said plurality of questions from said selected query card;

(i) providing an answer to said read question and determining whether said provided answer is correct, wherein if said provided answer is incorrect a player's turn is completed, wherein if said provided answer is correct another of said plurality of questions from said selected query card is read and step (i) is repeated;

(j) distributing a quantity of game money to said player corresponding to a number of correct provided answers to said read questions of step (i);

(k) repeating steps (e) through (j) above until a player acquires a predetermined sum of game money; and (l) moving said playing piece to said central starting and finishing area of said game board to finish play of said game.

10. The method of playing the Educational Board Game of claim 9, further comprising the steps of:

(m) providing a plurality of lifeskill cards having provided thereon a lifeskill question and an lifeskill answer;

(n) selecting one of said plurality of lifeskill cards when said playing piece is positioned in said central starting and finishing area of said game board and reading said lifeskill question from said selected lifeskill card; and (o) providing an answer to said read lifeskill question and determining whether said provided answer is correct, wherein if said provided answer is incorrect a player cannot advance from said central starting and finishing area to said diagonal movement track, and wherein if said provided answer is correct said player can advance from said central starting and finishing area to said diagonal movement track.

11. The method of playing the Educational Board Game of claim 10, further comprising the steps of:

(p) selecting one of said plurality of lifeskill cards when said playing piece is positioned on one of said plurality of individual spaces of said diagonal movement track of said game board and reading said lifeskill question from said selected lifeskill card; and (q) providing an answer to said read lifeskill question and determining whether said provided answer is correct, wherein if said provided answer is incorrect a player cannot advance along said plurality of individual spaces of said diagonal movement track, and wherein if said provided answer is correct said player can advance along said plurality of individual spaces of said diagonal movement track.

12. A method of playing an Educational Board Game, comprising the steps of:

(a) providing a game board including a central starting and finishing area, a perimetrical movement track, a bypass movement track parallel to a portion of said perimetrical movement track, and a diagonal movement track interconnecting said central starting and finishing area and said perimetrical movement track, wherein each of said perimetrical movement track, said bypass movement track, and said diagonal movement track are divided into a plurality of individual spaces, wherein a number of said plurality of individual spaces of said perimetrical movement track have a pair of opposing classrooms provided adjacent thereto, each of said pair of opposing classrooms comprising at least one of a subject matter classroom, a pop quiz classroom, a substitute teacher classroom, and an opportunity classroom, and wherein said opportunity classroom interconnects said bypass movement track and said perimetrical movement track;

(b) providing a plurality of query cards having provided thereon a plurality of questions and a plurality of answers for each of a number of subject matter categories, wherein said subject matter classroom of said game board corresponds to one of said number of subject matter categories;

(c) providing a plurality of opportunity cards having provided thereon favorable announcements and mandates and providing a plurality of risks cards having provided thereon unfavorable announcements and mandates, wherein a number of said plurality of individual spaces of said bypass movement track have provided thereon an instruction for drawing at least one of an opportunity card and a risk card;

(d) distributing an initial quantity of game money to each player;

(e) positioning a playing piece in said central starting and finishing area of said game board;

(f) rolling a die to determine movement of said playing piece among said plurality of individual spaces of said diagonal movement track and said plurality of individual spaces of said perimetrical movement track;

(g) moving said playing piece among said plurality of individual spaces of said diagonal movement track and said plurality of individual spaces of said perimetrical movement track corresponding to a result of said rolled die;

(h) choosing to move and moving said playing piece to said bypass movement track when said playing piece is positioned adjacent said opportunity classroom;

(i) selecting at least one of an opportunity card and a risk card when said playing piece lands on a corresponding one of said plurality of individual spaces of said bypass movement track having provided thereon a draw card instruction for drawing at least one of an opportunity card and a risk card;

(j) performing an action in accordance with said selected one of said opportunity card and said risk card;

(k) selecting one of said plurality of query cards when said playing piece is positioned adjacent at least one of said subject matter classroom, said pop quiz classroom, and said substitute teacher classroom, wherein said selected query card corresponds to at least one of said subject matter classroom when said playing piece is positioned adjacent said subject matter classroom and any of said number of subject matter categories when said playing piece is positioned adjacent at least one of said pop quiz classroom and said substitute teacher classroom;

(l) reading one of said plurality of questions from said selected query card;

(m) providing an answer to said read question and determining whether said provided answer is correct, wherein if said provided answer is incorrect a player's turn is completed, wherein if said provided answer is correct another of said plurality of questions from said selected query card is read and step (m) is repeated;

(n) distributing a quantity of game money to said player corresponding to a number of correct provided answers to said read questions of step (m);

(o) repeating steps (f) through (n) above until a player acquires a predetermined sum of game money; and (p) moving said playing piece to said central starting and finishing area of said game board to finish play of said game.

13. The method of playing the Educational Board Game of claim 12, further comprising the steps of:

(q) providing a plurality of lifeskill cards having provided thereon a lifeskill question and an lifeskill answer;

(r) selecting one of said plurality of lifeskill cards when said playing piece is positioned in said central starting and finishing area of said game board and reading said lifeskill question from said selected lifeskill card; and (s) providing an answer to said read lifeskill question and determining whether said provided answer is correct, wherein if said provided answer is incorrect a player cannot advance from said central starting and finishing area to said diagonal movement track, and wherein if said provided answer is correct said player can advance from said central starting and finishing area to said diagonal movement track.

14. The method of playing the Educational Board Game of claim 13, further comprising the steps of:

(t) selecting one of said plurality of lifeskill cards when said playing piece is positioned on one of said plurality of individual spaces of said diagonal movement track of said game board and reading said lifeskill question from said selected lifeskill card; and (u) providing an answer to said read lifeskill question and determining whether said provided answer is correct, wherein if said provided answer is incorrect a player cannot advance along said plurality of individual spaces of said diagonal movement track, and wherein if said provided answer is correct said player can advance along said plurality of individual spaces of said diagonal movement track.

* * * * *